US008517393B1

(12) United States Patent
Quigg

(10) Patent No.: US 8,517,393 B1
(45) Date of Patent: Aug. 27, 2013

(54) CLEAT ASSEMBLY, BELT, TRACK, OR LIKE SURFACE INCLUDING AN ARRAY OF TRACTION-ENHANCING CLEATS

(76) Inventor: Robert T. Quigg, Hazelton, PA (US)

( * ) Notice: Subject to any disclaimer, the term of this patent is extended or adjusted under 35 U.S.C. 154(b) by 464 days.

(21) Appl. No.: 12/975,618

(22) Filed: Dec. 22, 2010

Related U.S. Application Data

(60) Provisional application No. 61/290,416, filed on Dec. 28, 2009.

(51) Int. Cl.
*B62B 5/02* (2006.01)

(52) U.S. Cl.
USPC ...................................................... 280/5.22

(58) Field of Classification Search
USPC ................. 280/5.2, 5.22; 305/128, 193, 180, 305/167
See application file for complete search history.

(56) References Cited

U.S. PATENT DOCUMENTS

| 2,141,421 | A | | 12/1938 | Taylor | |
|---|---|---|---|---|---|
| 3,887,243 | A | * | 6/1975 | Chaumont | 305/128 |
| 4,844,562 | A | * | 7/1989 | Ranner | 305/193 |
| 5,158,309 | A | | 10/1992 | Quigg | |
| 5,813,948 | A | | 9/1998 | Quigg et al. | |
| 6,857,490 | B2 | | 2/2005 | Quigg | |
| 7,188,694 | B1 | | 3/2007 | Blair | |
| 7,316,405 | B2 | | 1/2008 | Kritman et al. | |
| 2003/0116927 | A1 | * | 6/2003 | Quigg | 280/5.22 |
| 2010/0236844 | A1 | * | 9/2010 | Howe et al. | 180/9.62 |
| 2011/0101135 | A1 | * | 5/2011 | Korus et al. | 239/723 |
| 2013/0048168 | A1 | * | 2/2013 | Reedy | 152/208 |

* cited by examiner

*Primary Examiner* — Tashiana Adams
(74) *Attorney, Agent, or Firm* — Howson & Howson LLP

(57) ABSTRACT

The assembly includes a cleat holder having a base, an outer wall opposite the base, and a cleat-receiving pocket having an opening in the outer wall. A cleat has one end mounted within the cleat holder and an opposite free end tip. The cleat is movable within the pocket between a gripping position in which the free end tip of the cleat projects through the opening of the pocket beyond the outer wall of the cleat holder and a retracted position in which the free end tip of the cleat at least partially retracts into the pocket. A spring is mounted in the pocket for resiliently urging the cleat from the retracted position toward the gripping position. The cleat assembly can include a plurality of separately manufactured, identical cleat holders secured in end-to-end alignment forming an endless belt, chain or the like.

20 Claims, 6 Drawing Sheets

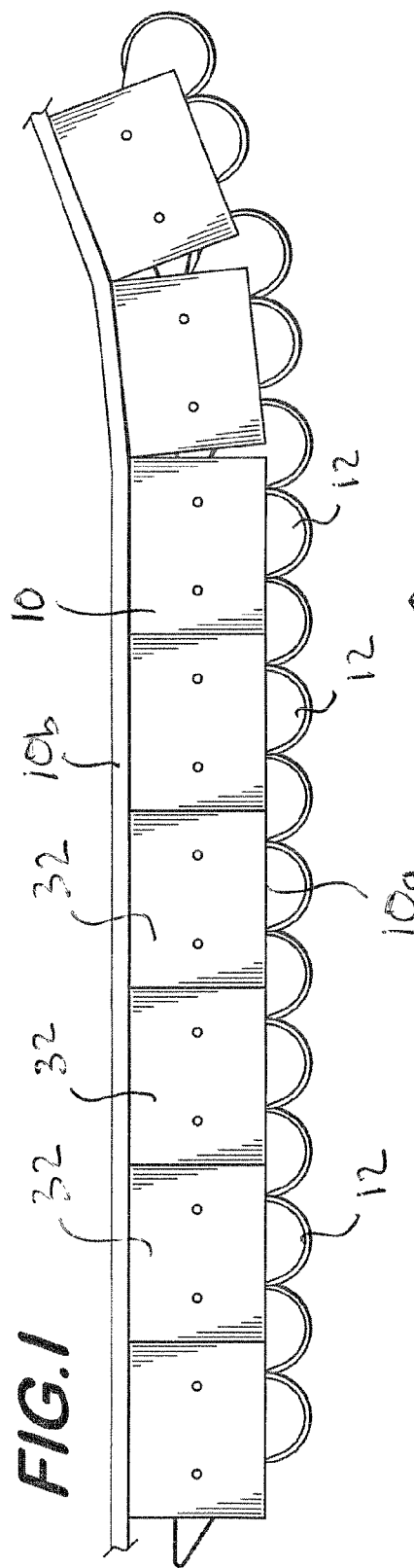
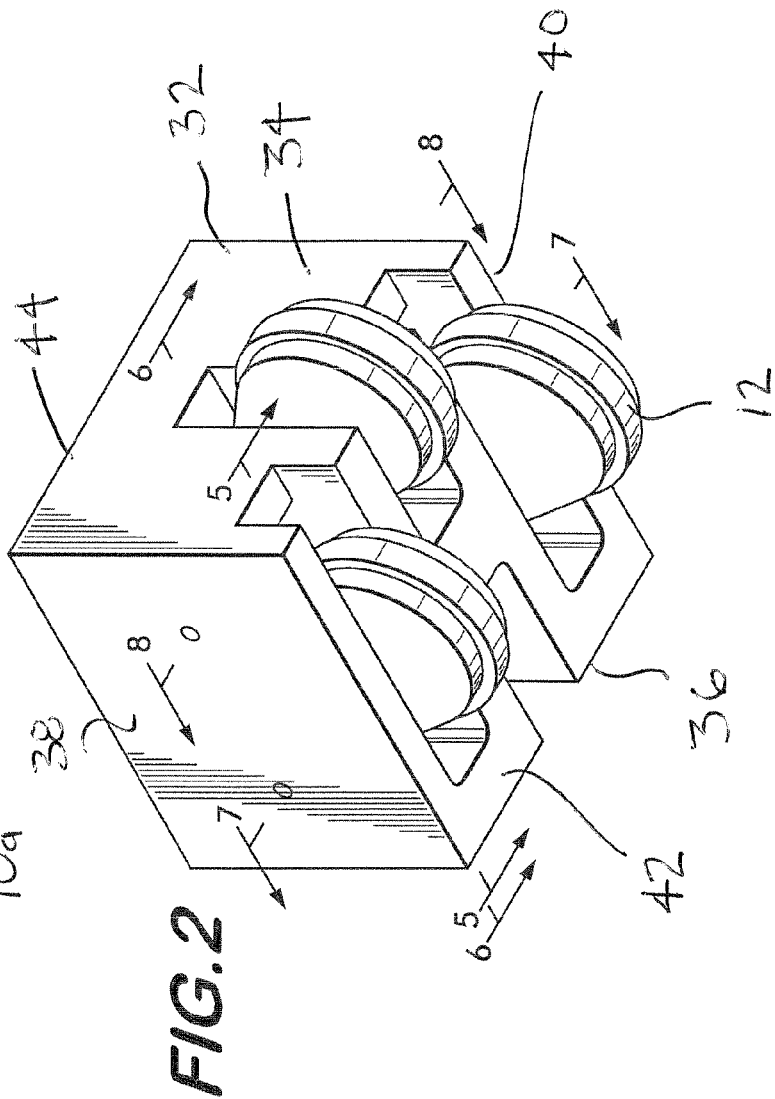

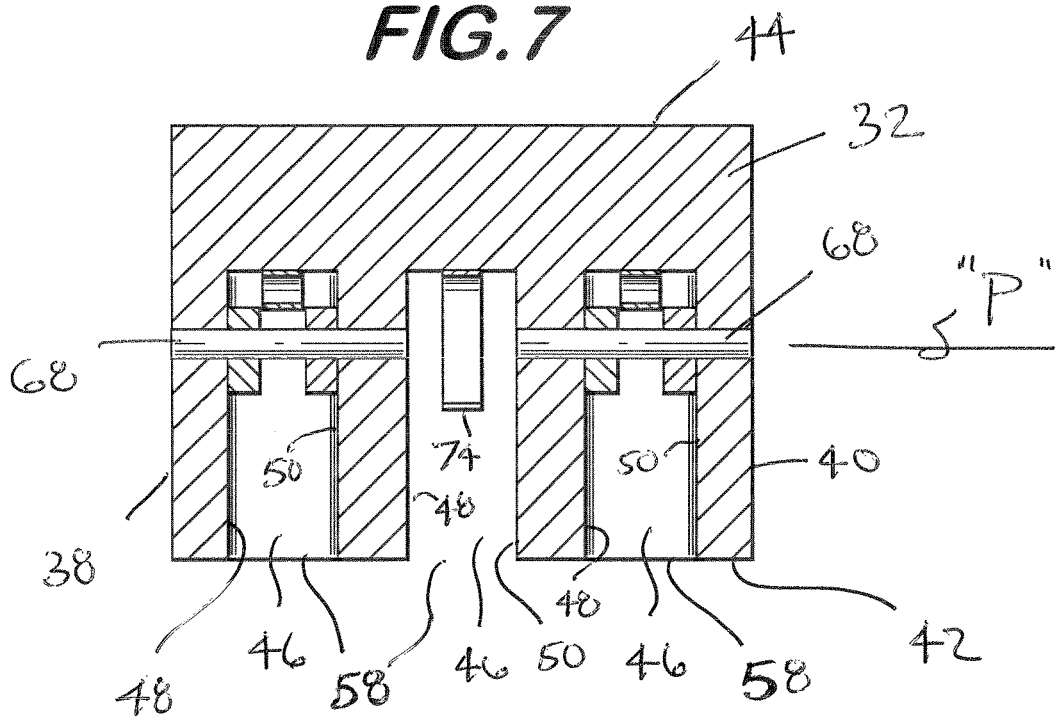
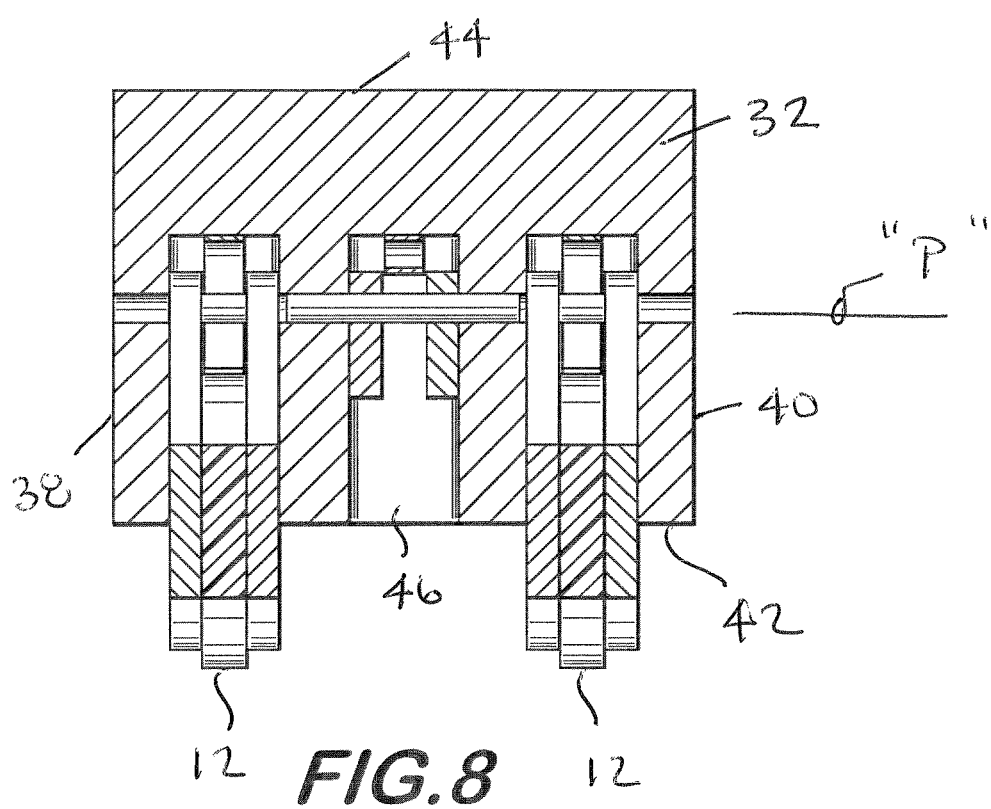

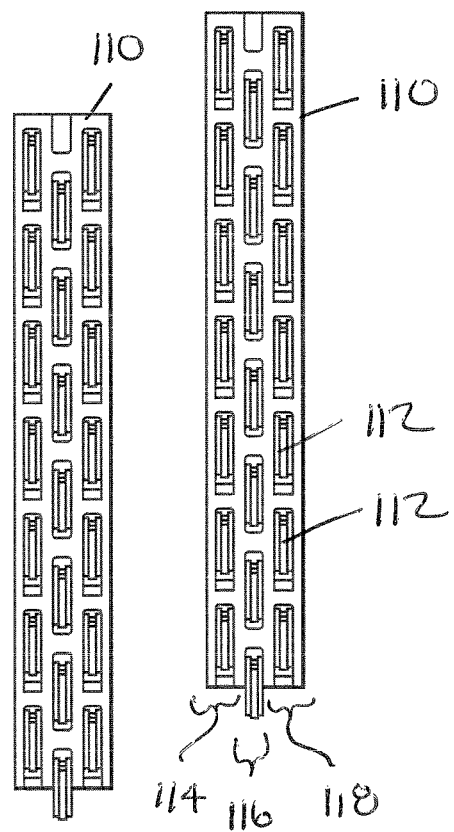
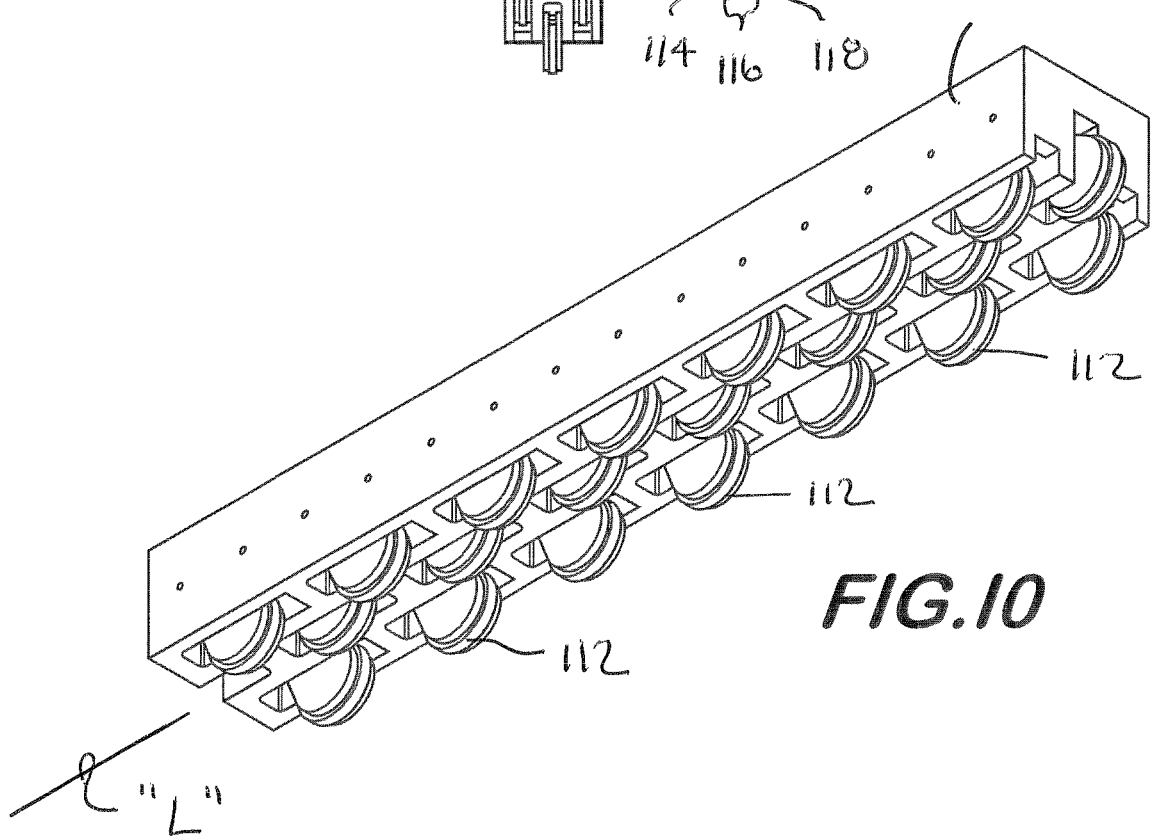

CLEAT ASSEMBLY, BELT, TRACK, OR LIKE SURFACE INCLUDING AN ARRAY OF TRACTION-ENHANCING CLEATS

CROSS-REFERENCE TO RELATED APPLICATIONS

This application claims the benefit under 35 USC §119(e) of U.S. Provisional Patent Application No. 61/290,416, filed Dec. 28, 2009.

BACKGROUND OF THE INVENTION

The present invention relates to a belt, track or surface having an array of cleats for improving traction with opposed surfaces or objects engaged by the belt, track or cleated-surface, and more specifically, the present invention relates to a cleat assembly for use in forming a belt, track or like cleated-surface.

Various apparatus, devices, and the like are provided with a surface that includes grips, cleats, or the like for purposes of improving traction between opposed engaging surfaces. Solely for purposes of example, U.S. Pat. Nos. 5,158,309 and 6,857,490 B2 issued to the inventor of the present application, Robert T. Quigg, disclose wheelchairs able to traverse an obstacle such as a set of stairs. These wheelchairs have track assemblies with endless belts adapted to engage the outer corner edges of steps, curbs and like obstacles to permit the wheelchair to safely ascend and descend such obstacles. The endless belts of such track assemblies include cleats to improve traction with the corner edges of steps.

The need for readily and safely ascending and/or descending stairs, curbs or other obstacles is not limited solely to wheelchairs. For example, any load carrying device or vehicle used to move relatively bulky or heavy loads or relatively fragile scientific equipment, furniture, or the like may also benefit from improved traction when ascending and/or descending stairs or like obstacles. For instance, such apparatus may include hand trucks, hand carts, and remote-controlled vehicles such as bomb detonating devices, tanks and the like. The use of cleats are not limited to endless belts but also can be used on surfaces of apparatus having reciprocating feet or other means used to support and propel an apparatus along a surface.

A further example where an improvement of traction may be beneficial is with respect to conveyers and like moving surfaces on which objects are supported and conveyed. For example, the surface of a conveyor can include cleats to grip objects being conveyed, particularly when the objects are being conveyed up or down a sloped portion of the conveyor.

Although the aforementioned stair-climbing wheelchairs, remote-controlled tanks, load carrying vehicles, conveyors and the like may function in a satisfactory manner for their intended purpose, there is a need for an improved belt, track or surface of a stair-climbing or crawling apparatus, load-carrying vehicle or cart, remote-controlled vehicle or tank, or conveyer which is able to readily and safely ascend and/or descend stairs, curbs, slopes and like obstacles and/or provide improved traction with underlying surfaces or objects supported thereon.

SUMMARY OF THE INVENTION

The present invention is directed to a cleat assembly for an apparatus such as a wheelchair, remote-control tank, hand truck, conveyor or the like. The assembly includes a cleat-holder having a base, an outer wall opposite the base, and a cleat-receiving pocket having an opening in the outer wall. A cleat has one end mounted within the cleat-holder and an opposite free end tip. The cleat is movable within the pocket between a gripping position in which the free end tip of the cleat projects through the opening of the pocket beyond the outer wall of the cleat-holder and a retracted position in which the free end tip of the cleat at least partially retracts into the pocket. The assembly also includes a spring mounted in the pocket for resiliently urging the cleat from the retracted position toward the gripping position.

According to one contemplated embodiment, the cleat-holder has a block-shaped body with opposite front and rear walls. In addition, the cleat-holder has at least one cleat-receiving pocket having opposite end walls that are located entirely within the body between the front and rear walls and at least one partial cleat-receiving pocket opening into one of the front wall and the rear wall of the body. Preferably, the at least one cleat-receiving pocket located entirely within the cleat-holder is laterally offset and staggered relative to the at least one partial cleat-receiving pocket. Also, the cleat can be mounted to the cleat holder body with a pin about which the cleat pivots between the gripping position in which the cleat engages one of the end walls of the pocket and the retracted position in which the cleat engages the opposite end wall of the pocket.

The present invention is also directed to a cleat assembly in which a plurality of separately-manufactured, identical cleat holders are secured in an end-to-end alignment. Each of the cleat holders having the form described above such that the pockets of the plurality of aligned cleat holders are aligned to form at least two staggered lines of pockets/cleats.

According to another aspect of the present invention, a stair or obstacle climbing apparatus is provided. The apparatus includes at least one elongate track for supporting the apparatus on the corners of stairs for purposes of ascending and/or descending the stairs. In addition the apparatus includes a plurality of separately-manufactured, identical cleat holders secured in end-to-end alignment on the at least one elongate track. The cleat holders are the same as described above and include pockets in which separate cleats and springs are mounted.

BRIEF DESCRIPTION OF THE DRAWINGS

The features and advantages of the present invention should become apparent from the following description when taken in conjunction with the accompanying drawings, in which:

FIG. 1 is a side elevational view of a portion of a belt, track or surface having an array of cleats according to the present invention;

FIG. 2 is a perspective view of a single link or block of a cleat assembly according to the present invention;

FIG. 7 is a cross-sectional view of the link or block of the cleat assembly shown in FIG. 2 taken along line 7-7;

FIG. 8 is a cross-sectional view of the link or block of the cleat assembly shown in FIG. 2 taken along line 8-8;

FIG. 9 is a plan view of a pair of tracks having cleats according to the pressing invention; and FIG. 10 is a perspective view of one of the tracks of FIG. 9.

DETAILED DESCRIPTION OF THE INVENTION

Before explaining the various possible embodiments of the present invention in detail, it is to be understood that the present invention is not limited in its application to the details of construction and arrangement of parts illustrated in the accompanying drawings, since the invention is capable of other embodiments and of being practiced and carried out in various ways. Also, it is to be understood that the phraseology and terminology employed herein are for the purpose of description and not limitation.

Figure 3:
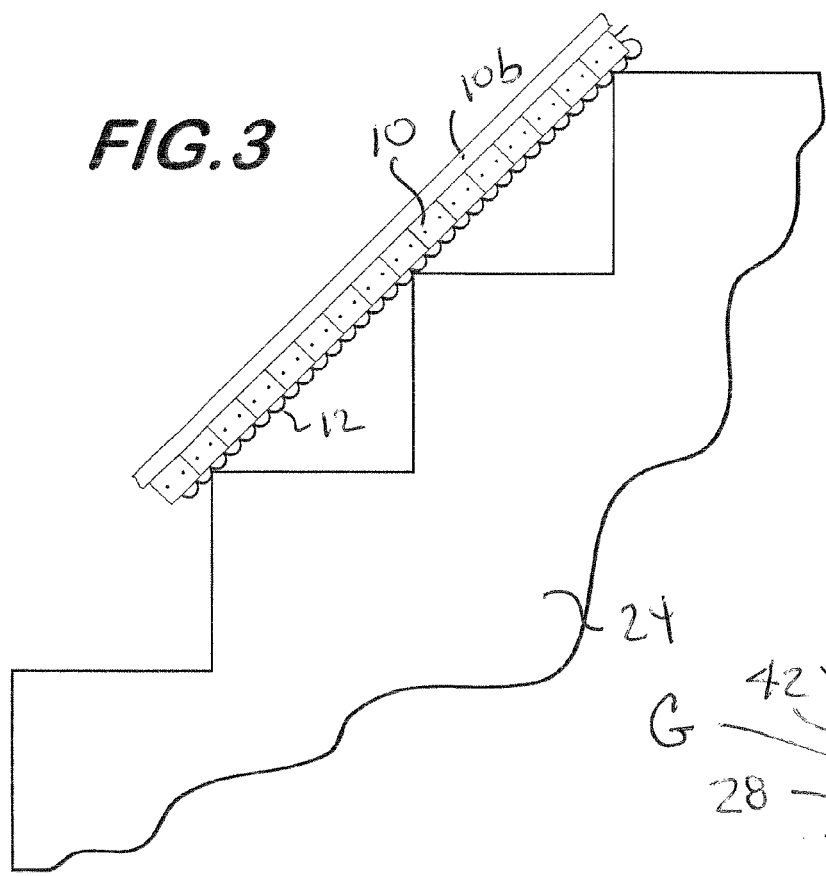
FIG. 3 is a side elevational view of the cleat assembly according to the present invention gripping a set of stairs.

The present invention is directed to the structure and operation of a cleat assembly that can universally be used in the construction of any belt, track, surface, remotely-controlled vehicle, wheelchair or like stair climbing apparatus, load-carrying vehicle, cart or hand truck, conveyance system, or any like apparatus or equipment in which traction between two confronting surfaces is desired. Simply by way of example, a stair-climbing apparatus may include one or more elongate tracks or supports that can engage an underlying stepped-surface of an obstacle being traversed. When the obstacle is a set of stairs, the tracks or supports of the apparatus are typically limited in only being able to engage the corners of several adjacent steps at spaced-apart locations along the length of the tracks or supports and, in this position, the tracks and supports are inclined due to the incline of the stairs. For instance see FIG. 3. Thus, it is extremely important to ensure a proper amount of traction with the corners of the stairs if the stairs are to be safely ascended or descended. Cleats can be used to improve traction.

By way of example, and not by way of limitation, FIG. 1 illustrates a portion of a track or support 10 having an array of cleats 12 extending from a face 10*a* thereof. In use, the face 10*a* of the support 10 having the cleats 12 could be used to engage or confront a surface of the obstacle or object, such as stairs. Typically, the track or support 10 will be elongate and is the mechanism responsible for crawling or climbing up or down the stairs. For instance, the support 10 can form part of an endless belt of a track assembly of a wheelchair or like stair-climbing apparatus, such as disclosed in U.S. Pat. Nos. 5,158,309 and 6,857,490 B2 discussed above, the disclosures of which are herein incorporated by reference. Alternatively, as shown in FIGS. 9-10, the track assemblies can be provided as elongate support feet 110 or the like that are not constructed as endless belts. In this instance, a plurality of support feet or tracks 110 having an array of cleats 112 can be provided such that they sequentially move in a forward direction in walking or crawling robotic manner. A still further example is that the endless belt, track or the like could form a surface of a conveyance system, such as a conveyor for moving objects supported on the conveyor.

Regardless of the particular design of the apparatus, the present invention is directed to a universal cleat assembly that can be used in the construction thereof. The cleat assembly according to the present invention greatly improves traction with the irregular surface of stairs or other obstacles or objects. This is accomplished with cleats that are designed to automatically and individually assume a gripping position or a retracted position depending upon where the particular cleat falls in relation to the corner of a step, object or other obstacle and in what direction forces are acting upon the cleat.

In general, the cleat assembly includes a plurality of separate cleats 12 that are individually connected to an elongate cleat holder or support 10. The elongate cleat holder 10 can define multiple longitudinally-extending rows of spaced-apart and aligned recesses, slots or pockets into which individual cleats 12 are mounted. For example, see rows 114, 116 and 118 on track 110 illustrated in FIGS. 9 and 10.

Figure 3A:
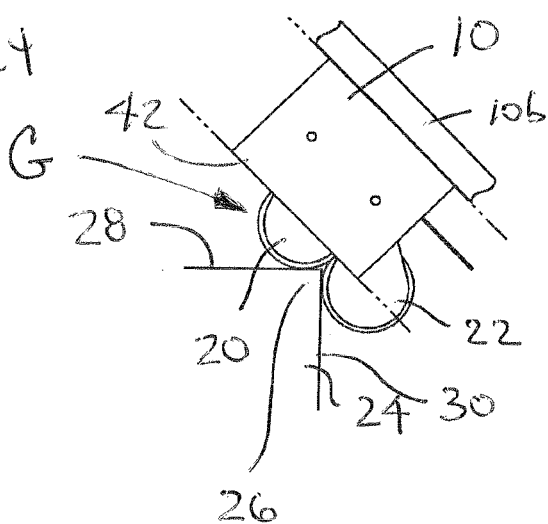
FIGS. 3A-3B are side elevational views of blocks or links of the cleat assembly according to the present invention engaging corners of steps at different points of engagement.
Figure 3B:
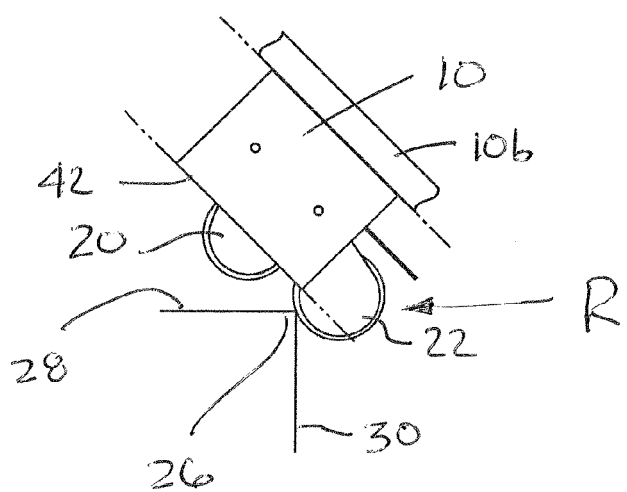

As best illustrated in FIGS. 3A-3B, each cleat 12 is mounted within each recess, slot or pocket and is independently movable relative to the cleat holder 10 such that the cleat is moveable between a gripping position "G" in which the cleat extends outwardly of the cleat holder 10 to engage a step surface and a retracted position "R" in which the cleat is at least partially retracted into its respective recess of the cleat holder 10 so that the cleat does not interfere with the step-gripping functions of other cleats within the assembly. Also, preferably adjacent rows of cleats and recesses are staggered relative to each other such that cleats within adjacent rows are offset from one another to ensure that a cleat of at least one row will always be in a position to properly grip a surface of a step. For example, see the offset rows 114, 116 and 118 in FIG. 9.

By way of example, FIG. 3A shows the function of two adjacent cleats 20 and 22 within a given row of cleats. When the cleat 20 engages a step 24 above the corner 26 of the step 24, the cleat 20 is automatically positioned in the gripping position "G" and essentially becomes hooked onto the horizontal landing 28 of the step 24 above the corner 26 due to the forces of gravity and the weight of the stair-climbing apparatus. Consequently, this engagement of cleat 20 with step 24 increases traction of the stair-climbing apparatus with the step 24. However, if the cleat 22 engages the step 24 on or slightly below the corner 26, the cleat 22 does not fall in a position in which it can effectively grip the step and its presence is therefore unwanted. Accordingly, cleat 22 is urged into the retracted position "R" by the force exerted on it by its engagement with the corner 26 and/or the vertical wall 30 of the step 24. See FIG. 3B. In this retracted position, the cleat 22 does not interfere with the gripping function being accomplished by cleat 20 or gripping functions of other cleats in other rows.

The elongate cleat holder 10 of the present invention can be provided by a series of separately-manufactured cleat holder segments or bodies 32 that are aligned end-to-end to form the elongate cleat holder 10. For an example of a single cleat holder or body 32, see FIG. 2. Merely for purposes of example, one-hundred-thirty separate segments 32 can be interconnected, linked, or otherwise aligned end-to-end to form an elongate cleat holder 10 that carries an array of approximately three-hundred-ninety separate cleats 12. Of course, a cleat holder 10 can be configured with any number of segments 32 and cleats 12. For purposes of example, FIG. 6 shows portions of three segments 32 in end-to-end alignment.

Figure 4:
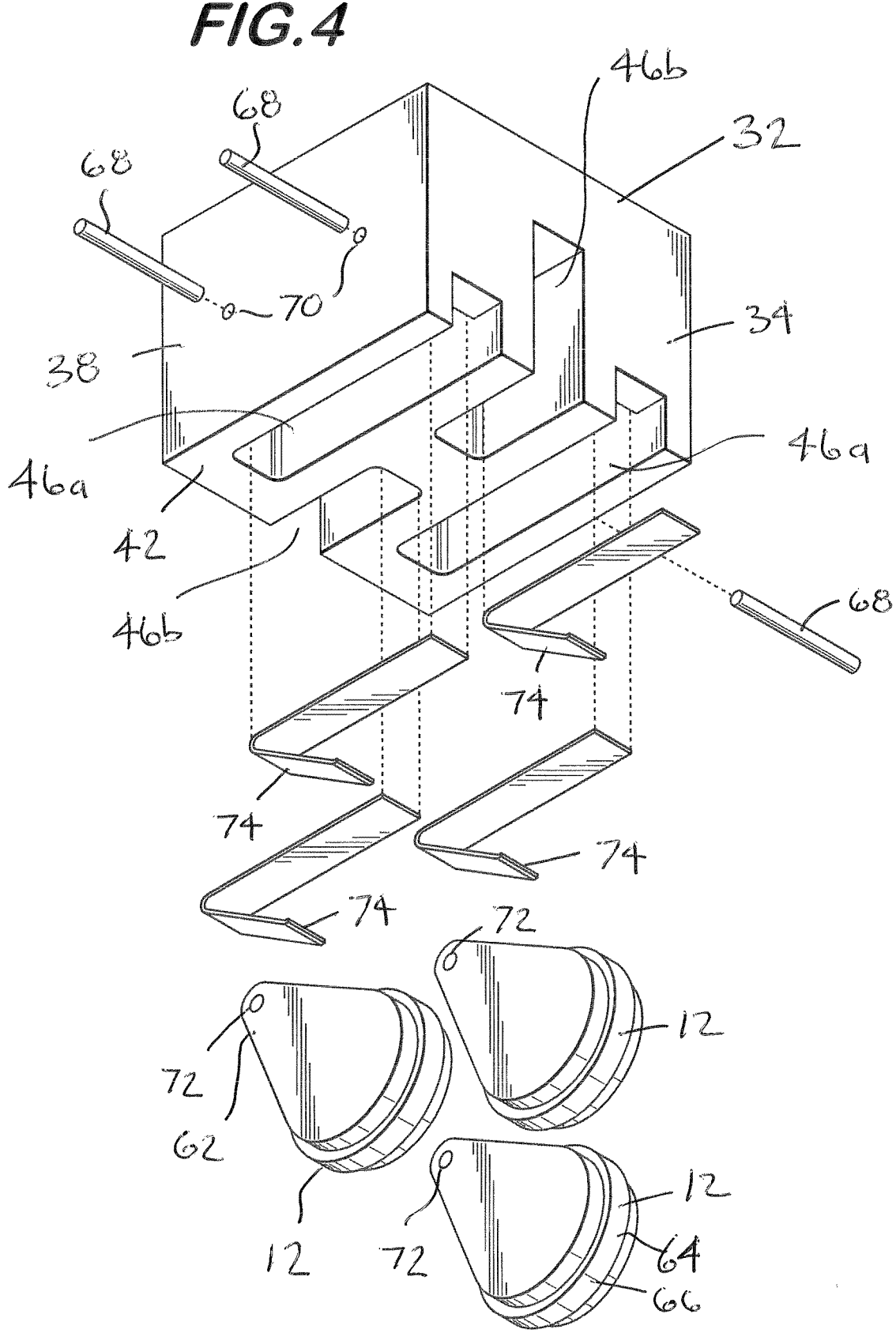
FIG. 4 is an exploded perspective view of the single link or block of the cleat assembly shown in FIG. 2.

One contemplated example of a cleat-holding segment 32 is a block-shaped design best illustrated in FIGS. 2 and 4. Each block includes opposite outer front and rear walls, 34 and 36, opposite outer sidewalls, 38 and 40, an outer top wall 42, and a base wall 44 opposite the wall 42. Such a configuration reduces manufacturing costs and provides ease of assembly due to its simple shape. Of course, more complicated or complex body shapes can also be utilized. Preferably, each of the blocks 32 is identical to all the other blocks to further reduce manufacturing costs (i.e., need for only a single mold) and to permit ease of end-to-end assembly. If desired, the blocks 32 can be injection molded of a hard plastic, such as PVC or the like. Of course, other materials such as metals, wood, composite materials, elastomeric materials, etc., can also be utilized as well as other block forming techniques. Further, elongate blocks, such as block 110 in FIG. 10, can also be utilized.

The separately-manufactured blocks 32 of the type shown in FIG. 2 can be secured, held or otherwise positioned in end-to-end alignment via attachment to a pre-existing elongate substantially-planar track or to a pre-existing continuous belt or support such as belt 10b shown in FIG. 1. Alternatively, the blocks 32 can be interconnected or linked together (such as via cooperating male/female type connections) to form a continuous elongate track or endless chain of links.

Figure 5:
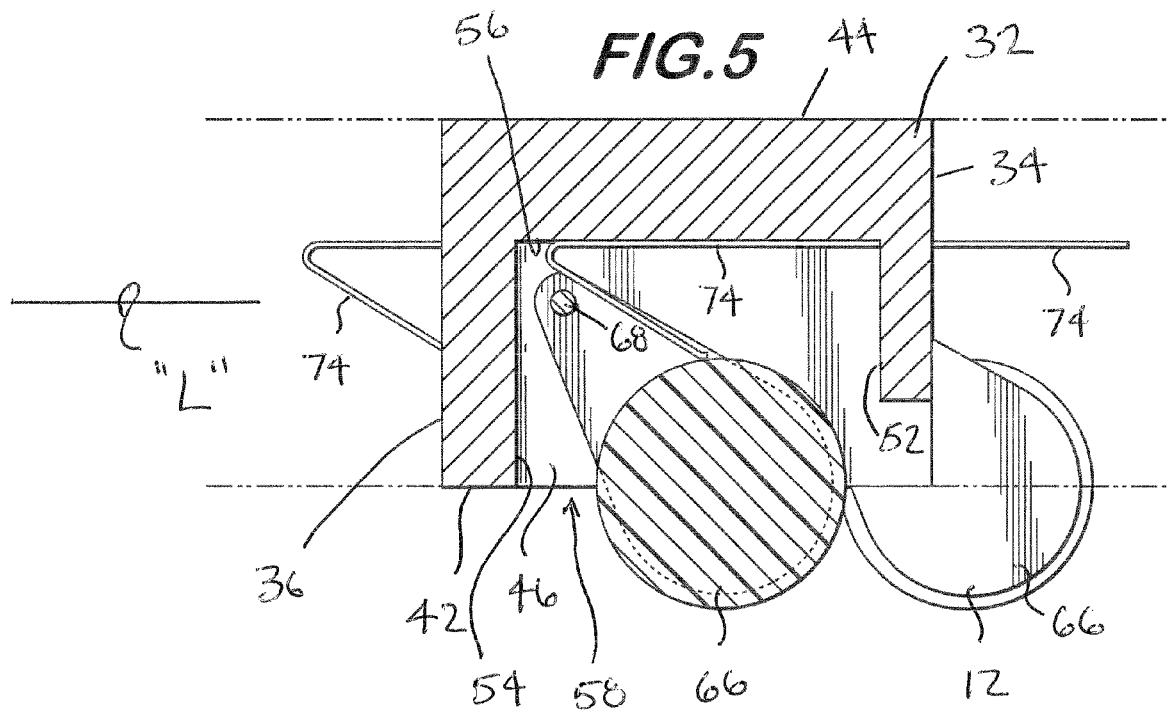
FIG. 5 is a cross-sectional view of the link or block of the cleat assembly shown in FIG. 2 taken along line 5-5.
Figure 6:
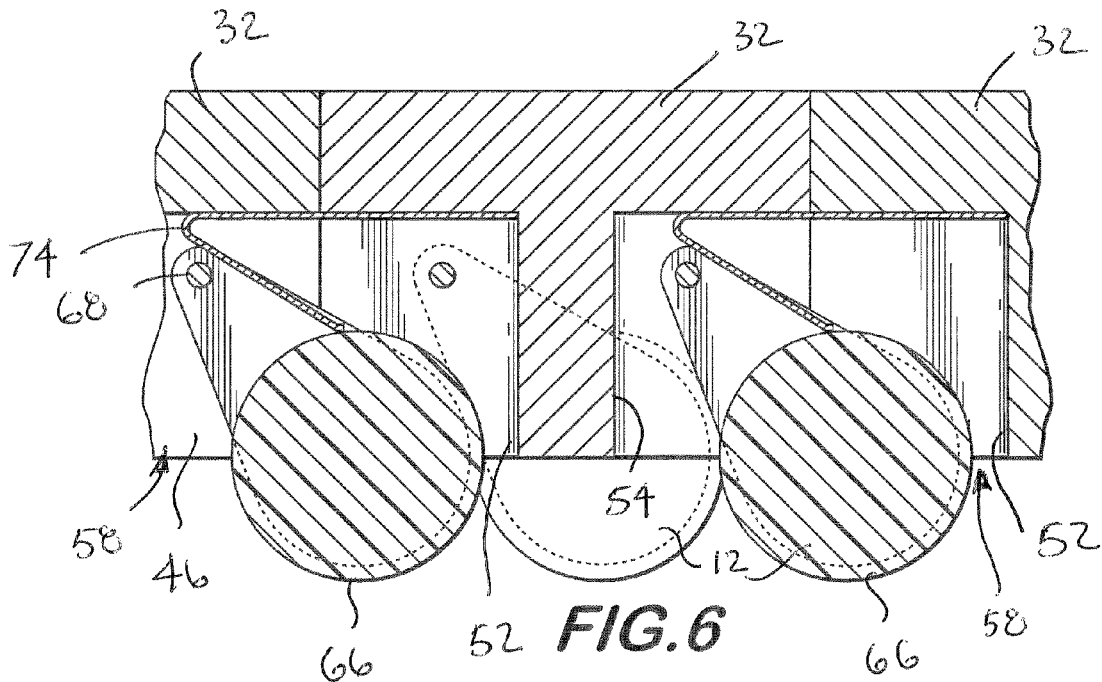
FIG. 6 is a cross-sectional view of the link or block of the cleat assembly shown in FIG. 2 taken along line 6-6 with identical adjacent links or blocks of the cleat assembly.

As best illustrated in FIGS. 4-8, each block defines one or more recesses, slots or pockets 46 and, when the blocks 32 are aligned end-to-end, the series of blocks 32 form multiple elongate rows of recesses, slots or pockets. Each recess or slot 46 is generally thin and provides an upwardly opening pocket. For instance, as best illustrated in FIGS. 7 and 8, each recess 46 is defined by a pair of opposed sidewalls, 48 and 50 and an open top 58, and as best illustrated in FIGS. 5 and 6, each recess 46 is defined by a front end wall 52, a rear end wall 54, and a closed bottom wall 56. In some cases, the recess or slot 46a is entirely formed within a single block 32; and in other cases, one block 32 forms half of the recess or slot 46b and an adjacent identical block 32 forms the other half of the recess or pocket 46b. See FIGS. 5 and 6.

Each row of recesses or slots 46 includes multiple spaced, aligned slots 46 that extend substantially parallel to the longitudinal direction "L" of the series of cleat holding blocks 32. In addition, the series of blocks 32 form multiple laterally spaced-apart rows such that the recesses or pockets 46 of each row are offset relative to the recesses or pockets of the adjacent row.

The purpose of each recess 46 is to house a single cleat 12. Each cleat 12 can be identical and can have a generally tear-drop shape in side elevation. See FIGS. 4-6. Accordingly, each cleat 12 has one end 62 that is used to mount the cleat 12 within the block 32 and an opposite end 64 that forms a free end tip 66 of the cleat that extends beyond the top wall 42 of the block 32. The free end tip 66 of the cleat 12 is the part of the cleat 12 that engages the surface of a step 24 or like obstacle. See FIGS. 3A and 3B. Preferably, the free end tip 66 is formed at a predetermined radius of curvature. The cleat 12 can be made of PVC and rubber or other material and its free end tip 66 can include a friction-enhancing or shock-reducing outer cover or coating. Alternatively, the cleat 12 can be a single integral piece of hard rubber or elastomeric material.

Each cleat 12 can be mounted within the block 32 with a pin 68. The pin 68 can extend through apertures 70 extending through the sidewalls 38 and 40 of the block 32 transversely through the block 32 and through a channel 72 extending through the mounting end 62 of the cleat 12. This type of connection permits the cleat 12 to pivot or rotate about the longitudinal axis "P" of the pin 68. Thus, the cleat 12 can pivot relate to the pin 68 into engagement with the rear end wall 54 of the recess 46 and the cleat 12 can pivot relative to the pin 68 into engagement with the front end wall 52 of the recess 46. Thus, the front and rear end walls, 52 and 54, of the recess 46 function to limit the pivoting movement of its respective cleat 12. When the cleat 12 is pressed against the rear end wall 54 by engagement with the upper horizontal landing 28 of the step 24, the free end tip 66 of the cleat 12 projects from the opening 58 of the recess 46 and is in position to grip the step 24 or like surface to improve traction therewith. In contrast, when the cleat 12 is pressed against the front end wall 52 of the recess 34, it is in a retracted position so that it does not interfere with the gripping operation of other cleats 12.

To ensure that the cleats 12 are in proper position to grip a step 24, each recess 46 houses a spring 74 or like mechanism adjacent the bottom wall 56 of the recess 46. For example, see springs 74 illustrated in FIGS. 4-6. The spring 74 provides a resilient force on the cleat 12 to urge the cleat 12 away from the front end wall 52 of the recess 46 and toward the rear end wall 54. Thus, the spring 74 urges the cleat 12 out of the retracted position "R" and off of the front end wall 52 so that the cleat 12 is in a position to readily grip a surface of a step 24, if and when needed. However, if an external force is applied on the cleat 12 in a direction toward the front end wall 52, the cleat 12 will retract into the recess 46 of the block 32 toward the front end wall 52. Of course, when this externally applied force is removed, the spring 74 resiliently re-positions the cleat 12 in a direction toward the rear end wall 54 of the recess 46.

As suggested above, an assembly including the above referenced blocks and cleats can be used to form an endless belt. In this case, the separate blocks can be separately attached to an inner belt as shown in FIG. 1 or they can be linked to each other at their ends. The outward facing cleats can be used to confront and engage an underlying surface, if utilized on a wheelchair, hand truck, remote control vehicle or the like. Alternatively, if the belt forms part of a conveyor, the upward facing surface of the belt can be used to support boxes or other objects on the conveyor. In this case, the cleats grip the objects and prevent shifting thereof as the objects are being conveyed, even if the objects are being conveyed up or down a sloped surface. The cleat assembly of the present invention permits such a conveyor to be sloped at greater angles to the horizontal thereby conserving space and shortening the length of the conveyor. Finally, the blocks and cleats can be in the form of a rigid track such as shown in FIGS. 9 and 10.

In some embodiments, it may be useful to include an electronic sensor so that the state of each cleat is known (i.e., pushed into the recess in a retracted position, extended to a gripping position, or in a neutral position). The wiring of the sensors can run along or within a belt to which the cleat holders are attached or can run through the cleat holders. The sensed state of the cleats may be used, for instance, to determine if a wheelchair, remote control tank, or the like is properly aligned and square with the edges of the steps of a set of stairs. For instance, corresponding cleats in the outer rows of cleats should have the same state if the wheelchair or remote-controlled device is properly aligned relative to the stairs. As a safety feature, if the sensors determine an improper alignment, the apparatus may automatically back up off the stairs and attempt to re-align with the stairs.

While a preferred cleat assembly has been described in detail, various modifications, alterations, and changes may be made without departing from the spirit and scope of the wheelchair according to the present invention as defined in the appended claims.

I claim:
1. A cleat assembly, comprising:
a cleat-holder having a base, an outer wall opposite said base, and a pocket having an opening in said outer wall;
a cleat mounted within said pocket, said cleat having one end mounted within said cleat holder and an opposite free end tip, said cleat being movable within said pocket to a gripping position in which said free end tip of said cleat projects through said opening of said pocket beyond said outer wall of said cleat holder and to a retracted position in which said free end tip at least partially retracts into said pocket; and a spring mounted within said cleat holder for resiliently urging said cleat from said retracted position toward said gripping position.

2. A cleat assembly according to claim 1, further comprising a plurality of said cleat holders aligned end-to-end to form an elongate aligned row of pockets having a cleat and a spring mounted within each pocket such that each of said cleats is independently movable within its respective pocket between a gripping position in which said free end tip of said cleat projects through said opening of said pocket beyond said outer wall of said cleat holder and to a retracted position in which said free end tip at least partially retracts into said pocket.

3. A cleat assembly according to claim 1, wherein said cleat holder is block-shaped body having a front wall and rear wall.

4. A cleat assembly according to claim 3, wherein said cleat holder has at least one pocket having opposite end walls that are located entirely within said cleat block-shaped body between said front and rear walls of said body.

5. A cleat assembly according to claim 4, wherein said cleat holder further comprises at least one partial pocket opening into one of said front wall and rear wall of said block-shaped body.

6. A cleat assembly according to claim 5, wherein said at least one pocket located entirely within said body is laterally offset and staggered from said at least one partial pocket.

7. A cleat assembly according to claim 4, wherein said cleat is mounted to said body with a pin about which said cleat pivots between said gripping position in which said cleat engages one of said end walls of said pocket and said retracted position in which said cleat engages the opposite end wall of said pocket.

8. A cleat assembly, comprising:
a plurality of separately-manufactured, identical cleat holders secured in end-to-end alignment, each of said cleat holders having an outer wall and multiple separate cleat-receiving pockets formed therein, said pockets of said plurality of aligned cleat holders being aligned to form at least two staggered lines of pockets;
a separate cleat mounted within each of said pockets, each of said cleats having one end mounted within said cleat holder and an opposite free end tip, each of said cleats being separately movable within said pocket to a gripping position in which said free end tip of said cleat projects from said pocket and to a retracted position in which said free end tip at least partially retracts into said pocket; and
a spring mounted within each of said pockets for resiliently urging its respective cleat from said retracted position toward said gripping position.

9. A cleat assembly according to claim 8, wherein each of said cleat holders is block-shaped having opposite front and rear walls.

10. A cleat assembly according to claim 9, wherein said multiple separate cleat-receiving pockets of each of said cleat holders includes at least one cleat-receiving pocket having opposite end walls that are located entirely within said cleat holder between said front and rear walls of said cleat holder and at least two partial cleat-receiving pockets with one opening into said front wall of said cleat holder and the other opening into said rear wall of said cleat holder.

11. A cleat assembly according to claim 10, wherein said at least one cleat-receiving pocket located entirely within said cleat holder is laterally offset and staggered relative to said at least two partial cleat-receiving pockets.

12. A cleat assembly according to claim 11, wherein each of said cleats is mounted to said cleat-holder with a pin about which said cleat pivots between said gripping position in which said cleat engages one of said end walls of said pocket and said retracted position in which said cleat engages the opposite end wall of said pocket.

13. A cleat assembly according to claim 12, wherein said free end tip of each of said cleats is provides a curved surface formed at a radius of curvature.

14. A cleat assembly according to claim 13, wherein each of said cleats has a tear-drop shape in side view.

15. A cleat assembly according to claim 14, wherein each of said cleat holders is molded of a rigid plastic material.

16. A cleat assembly according to claim 15, wherein said plurality of cleat holders are secured together indirectly via attachment to an underlying support or directly via a linked connection.

17. An obstacle-climbing apparatus, comprising:
at least one elongate track for supporting the apparatus on the corners of stairs for purposes of ascending and/or descending the stairs; and
a plurality of separately-manufactured, identical cleat holders secured in end-to-end alignment on said at least one elongate track;
each of said cleat holders having an outer wall and multiple separate cleat-receiving pockets formed therein, said pockets of said plurality of aligned cleat holders being aligned to form at least two laterally spaced-apart, staggered lines of pockets;
each of said pockets having a separate cleat mounted therein, each of said cleats having one end mounted within its respective pocket and an opposite free end tip, each of said cleats being separately movable within said pocket to a gripping position in which said free end tip of said cleat projects from its respective pocket and to a retracted position in which said free end tip at least partially retracts into its respective pocket; and
each of said pockets having a spring mounted therein for resiliently urging said cleat from said retracted position toward said gripping position.

18. An apparatus according to claim 17, wherein said track includes an endless belt on which said cleat holders are connected or wherein said cleat holders are linked together and form an endless chain.

19. An apparatus according to claim 17, wherein each of said cleat holders is block-shaped having opposite front and rear walls, wherein said multiple separate cleat-receiving pockets of each of said cleat holders includes at least one cleat-receiving pocket having opposite end walls that are located entirely within said cleat holder between said front and rear walls of said cleat holder and at least two partial cleat-receiving pockets with one opening into said front wall of said cleat holder and the other opening into said rear wall of said cleat holder.

20. A stair-climbing apparatus according to claim 19, wherein each of said cleats is mounted to said cleat-holder with a pin about which said cleat pivots between said gripping position in which said cleat engages one of said end walls of said pocket and said retracted position in which said cleat engages the opposite end wall of said pocket.

* * * * *